UNITED STATES PATENT OFFICE.

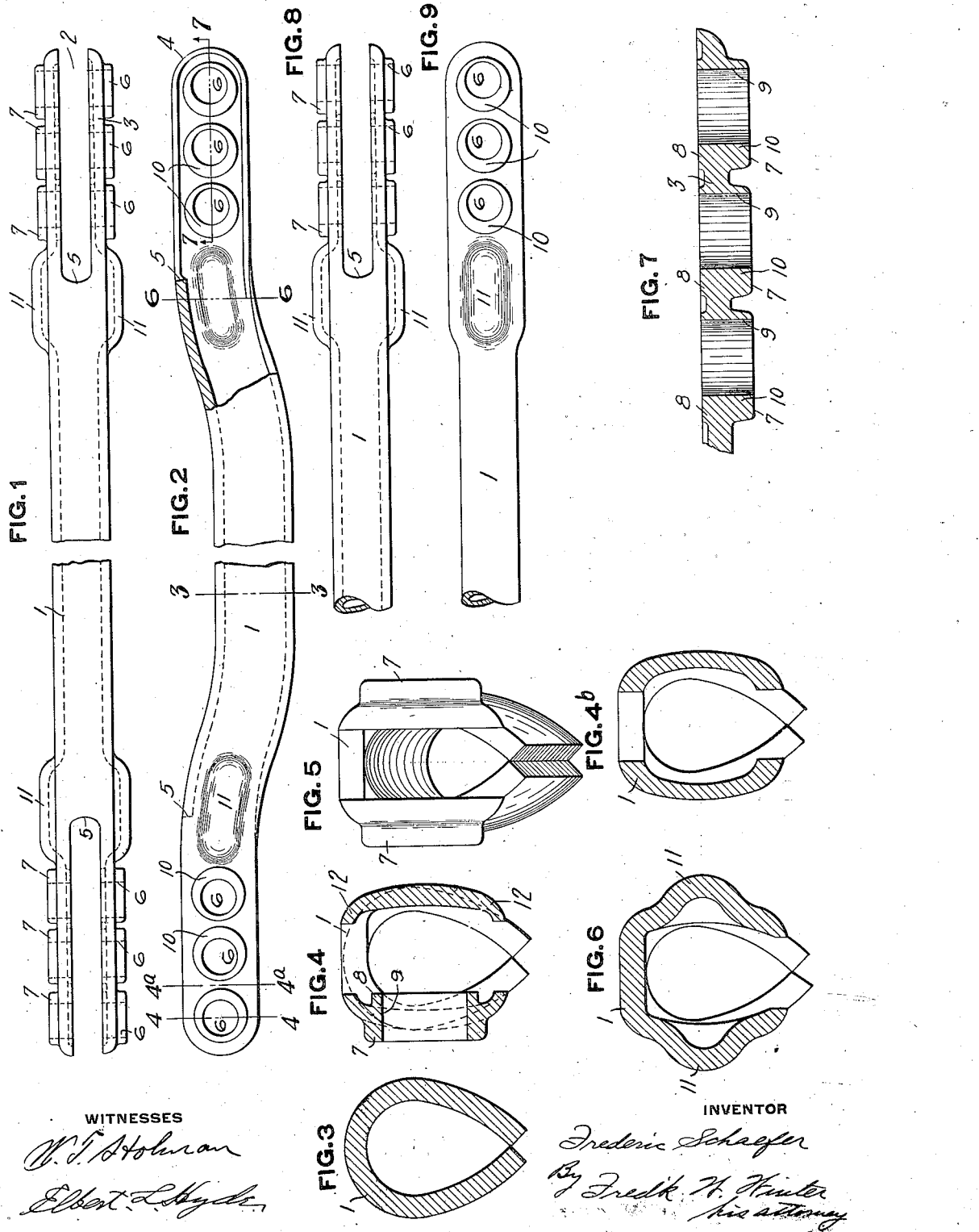

FREDERIC SCHAEFER, OF PITTSBURGH, PENNSYLVANIA.

CONNECTING-BAR.

1,211,763.  Specification of Letters Patent.  Patented Jan. 9, 1917.

Application filed February 4, 1916. Serial No. 76,185.

*To all whom it may concern:*

Be it known that I, FREDERIC SCHAEFER, a resident of Pittsburgh, in the county of Allegheny and State of Pennsylvania, have invented a new and useful Improvement in Connecting-Bars, of which the following is a specification.

This invention relates to pressed metal connecting bars, such as are used for connecting the brake levers of railway trucks, or for other purposes, and to push rods for brake cylinders, etc.

The object of the invention is to provide an improved bar or rod of the kind described which has maximum strength for its weight, which is reinforced at all of the usual weak points against bending or compressive strains, whose perforated ears for connection to the pivot pin or pins are deeper in the lateral direction than the original thickness of the metal to reinforce them against lateral bending strains, and are further formed to provide an extended bearing upon the pivot pin or pins to which they are connected, thereby to reinforce them against wear by said pins, and are further offset from the main body portion of the bar to avoid interference with the adjacent parts of the truck or brake mechanism; and further a bar or rod which is durable, is not likely to fail in service, and which can be readily manufactured at low cost.

Further objects of the invention are in part obvious and in part will appear more in detail hereinafter.

The invention comprises the bar or rod hereinafter described and claimed.

In the drawings, Figure 1 is a plan view of a connecting bar embodying the invention; Fig. 2 is a side elevation thereof; Fig. 3 is a cross section on the line 3—3, Fig. 2; Fig. 4 is a cross section, the left half being taken on the line 4—4 and the right half on the line 4ᵃ—4ᵃ, Fig. 2; Fig. 4ᵇ is a detail section showing a modification; Fig. 5 is an end view; Fig. 6 is a cross section on the line 6—6, Fig. 2; Fig. 7 is a horizontal section on the line 7—7, Fig. 2; and Figs. 8 and 9 are respectively a side elevation and a plan view of a push rod embodying the invention.

The connecting bar shown in the drawings comprises a body portion 1 formed of pressed metal, preferably steel, and having a suitable hollow cross section which may be any of the sections described and shown in my prior application for connecting bar, filed July 7, 1914, Serial No. 849,550. At each end said bar is slotted longitudinally, as at 2, to provide pairs of oppositely disposed ears 3 whose outer ends are rounded, as at 4. The ears 3 of each pair are in substantially parallel planes, and the ears at opposite ends of the bar are in line with each other, said ears being offset laterally and in the vertical plane from the main body portion 1 of the bar, as shown in Fig. 2. The slots 2 between the oppositely disposed ears extend from the outer ends of the bar inwardly to the points marked 5, where the bar begins to curve in the vertical plane from the ears to its straight body portion.

The pairs of ears at opposite ends of the bar are provided with one or a plurality of sets of oppositely disposed pin eyes 6 for receiving pivot pins for connecting said bar to other parts. When a plurality of pin eyes are provided in opposite ends of the bar the centers of the holes of said eyes will be in line with each other, as shown in Fig. 2. The metal forming each of said pin eyes is displaced laterally, either inwardly toward the center line of the bar, or outwardly, or both, the latter arrangement being shown in Fig. 4, to form protuberances 7 on the outer face of the ears and protuberances 8 on their inner faces, which gives an extended bearing surface 9 at each hole in contact with the pivot pin passing therethrough. Furthermore, the offset metal surrounding each hole is eccentric thereto, so that the wall of the protuberance around said hole is thicker on one side, as at 10, than on its opposite side. The bar shown in the drawings has the thicker portion of the wall on the inner side of the hole, to wit, that side nearest the center of the bar. Each of the holes is therefore reinforced against wear due to compressive strains by the pivot pin to which the bar is connected.

To reinforce the bar against bending strains, especially sidewise or in a direction parallel to the axes of the eyes 6, and to further reinforce it at the junction of the ears with the body portion of the bar, the metal of the side portions of said bar, opposite the roots of the slots 2, is displaced laterally, as at 11, into arch form. The bulge or protuberance thereby formed extends for a short distance lengthwise of the bar to either side of the root of the slot 2 and not only increases the beam effect and strengthens the bar against lateral bending stresses but also reinforces it against compressive stresses. The ears 3 are also reinforced from end to end against lateral bending strains, by forging the metal of said ears to increase their depth in the horizontal direction to an amount greater than the original thickness of the metal itself, to wit, the thickness of the body portion of the bar. As shown in Fig. 4, the metal of said ears is bent longitudinally around the longitudinal axis into the form of a shallow trough, and may be thicker at its central portion than at its edges 12, as in Fig. 4, or the reverse, as in Fig. 4ᵇ. The increase in the depth of said ears materially reinforces them against lateral bending strains without increase in the weight of the bar.

The connecting bar described is preferably made from a flat sheet or plate of forged or rolled steel, which is first slitted at its opposite ends to form the ears 3. Either simultaneously with the slitting operation, or before or after the same, each end of the blank is subjected to a forging or die pressing operation to punch the holes 6 and forge the metal of the ears around said holes to produce the eccentric protuberances 7 and 8 of the pin eyes 6, thereby increasing the bearing surface for the pivot pins and reinforcing the bar against wear thereby. The same operation forms the protuberances 12 opposite the roots of the slots 2 and increases the thickness of the ears in the horizontal direction above the thickness of the body portion of the bar. The blank is then bent or folded on its central longitudinal line to the proper hollow cross sectional shape, such as that shown for example in Fig. 3, but which cross sectional shape may be any of the forms shown in my prior application referred to. Either before or after bending the bar to hollow form the metal may be bent to offset the ears 3 from the main body portion 1 of the bar or to the shape shown in Fig. 2.

After the bar has been forged, folded and bent to the proper form the openings 6 lying directly opposite each other are trued by a reaming operation so as to produce a smooth bearing surface for the pivot pins and reduce the wear at this point.

The invention may also be applied to push rods, such as are used in brake cylinders and the like, one of said rods being shown in Figs. 8 and 9. Said rod differs from the connecting bar shown in Figs. 1 and 2 only in that its ears 3 are not offset from the main body portion of the bar, although they may be if so desired, and only one end of said bar is provided with perforated ears. The main body portion of this bar may be of round cross section and its opposite end may be provided with a plug or head. This is a very cheap and strong push rod which can be made at low cost and has maximum strength for the metal employed.

The bar described is simple and can be readily manufactured by ordinary machinery. It has maximum strength for its weight, is reinforced at all the usual points against bending or compressive strains and against wear by the pivot pins, and is not liable to fail under the most severe conditions encountered in service.

No claim is made herein to the method of forming the protuberances around the pin eyes so that they extend in both directions by thinning the metal to form these protuberances, such method and the structure formed thereby being reserved for another application filed Dec. 18—16 Serial No. 137,618.

What I claim is:—

1. A bar, comprising a one-piece hollow body slotted at its end to form a pair of oppositely disposed ears, said ears being provided with oppositely disposed pin eyes and protuberances around said eyes to increase the bearing surface, said protuberances being eccentric to said eyes.

2. A bar, comprising a one-piece hollow body slotted at its end to form a pair of oppositely disposed ears, said ears being provided with oppositely disposed pin eyes and protuberances around said eyes to increase the bearing surface, the walls of said protuberances being thicker on one side of said eyes than on the other.

3. A bar, comprising a one-piece hollow body slotted at its end to form a pair of oppositely disposed ears, said ears being provided with oppositely disposed pin eyes and protuberances around said eyes to increase the bearing surface, the walls of said protuberances being thicker on the inner side of said eyes than on their outer sides.

4. A bar, comprising a one-piece hollow body slotted at its end to form a pair of oppositely disposed ears, said ears being provided with oppositely disposed pin eyes and protuberances around said eyes on the inner and outer surfaces of said ears, to increase the bearing surface, said protuberances being eccentric to said eyes.

5. A bar, comprising a one-piece hollow body member slotted at its opposite ends to form pairs of longitudinally extending oppositely disposed perforated ears, the holes in the ears at opposite ends of the bar being in line with each other and out of line with the main body member.

6. A bar, comprising a one-piece hollow body member slotted at its opposite ends to form pairs of longitudinally extending oppositely disposed perforated ears, the holes in the ears at opposite ends of the bar being in line with each other and out of line with the main body member, the metal of said body member being displaced laterally into arch form to increase the strength of the bar.

7. A bar, comprising a one-piece hollow body member slotted at its ends to form pairs of oppositely disposed perforated ears, the holes in the ears at opposite ends of said bar being offset from its main body portion and lying in line with each other, said ears being provided with thickened portions around said apertures to increase the bearing surface.

8. A bar, comprising a one-piece hollow body member slotted at its ends to form pairs of oppositely disposed ears, the ears at opposite ends of said bar being offset from its main body portion and lying in line with each other, said ears being provided with oppositely disposed apertures and thickened portions around said apertures to increase the bearing surface, the thickened wall around said apertures being thicker on one side of said apertures than on the other.

9. A bar, comprising a one-piece hollow body slotted at its end to form a pair of oppositely disposed ears, said ears being provided with oppositely disposed apertures and protuberances around said apertures to increase the bearing surface and the thickness of said ears in a horizontal direction beyond the thickness of the metal of the body, thereby reinforcing said ears against lateral bending strains, said bar being bent in the vertical plane to offset said ears from the main body portion of the bar.

In testimony whereof, I have hereunto set my hand.

FREDERIC SCHAEFER.

Witnesses:
GLENN H. LERESCHE,
A. E. JOHNSON.